(12) United States Patent
Guo et al.

(10) Patent No.: US 12,326,915 B2
(45) Date of Patent: Jun. 10, 2025

(54) METHOD AND APPARATUS OF TRAINING MODEL, DEVICE, MEDIUM, AND PROGRAM PRODUCT

(71) Applicant: Beijing Baidu Netcom Science Technology Co., Ltd., Beijing (CN)

(72) Inventors: Ruoyu Guo, Beijing (CN); Yuning Du, Beijing (CN); Weiwei Liu, Beijing (CN); Xiaoting Yin, Beijing (CN); Qiao Zhao, Beijing (CN); Qiwen Liu, Beijing (CN); Ran Bi, Beijing (CN); Xiaoguang Hu, Beijing (CN); Dianhai Yu, Beijing (CN); Yanjun Ma, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 568 days.

(21) Appl. No.: 17/479,061

(22) Filed: Sep. 20, 2021

(65) Prior Publication Data

US 2022/0004811 A1     Jan. 6, 2022

(30) Foreign Application Priority Data

Mar. 25, 2021   (CN) .......................... 202110321597.X (51) Int. Cl.
    *G06F 18/214*   (2023.01)
    *G06F 18/21*    (2023.01)
    *G06F 18/24*    (2023.01)

(52) U.S. Cl.
    CPC .......... *G06F 18/214* (2023.01); *G06F 18/217* (2023.01); *G06F 18/24* (2023.01)

(58) Field of Classification Search
    None
    See application file for complete search history.

(56) References Cited

U.S. PATENT DOCUMENTS

| 2016/0078339 A1 | 3/2016 | Li et al. |
| 2017/0011738 A1* | 1/2017 | Senior .................. G10L 15/063 |
| 2021/0056417 A1 | 2/2021 | Zhang et al. |

FOREIGN PATENT DOCUMENTS

| JP | 2017-531255 A | 10/2017 |
| JP | 2020-140466 A | 9/2020 |
| WO | WO-2021202170 A1 * | 10/2021 ........... A61B 3/0025 |

OTHER PUBLICATIONS

Official Communication issued in corresponding Japanese Patent Application No. 2021-153612, mailed on Nov. 1, 2022.

(Continued)

*Primary Examiner* — Vincent Rudolph
*Assistant Examiner* — Meredith Taylor
(74) *Attorney, Agent, or Firm* — Keating & Bennett, LLP (57) ABSTRACT

There is provided a method and apparatus of training a model, a device, and a medium, which relate to artificial intelligence, and in particular to a deep learning and image processing technology. The method may include: determining a plurality of augmented sample sets associated with a plurality of original samples; determining a first constraint according to a first model based on the plurality of augmented sample sets; determining a second constraint according to the first model and a second model based on the plurality of augmented sample sets, wherein the second constraint is associated with a difference between outputs of the first model and the second model for one augmented sample, and the first model has a complexity lower than that of the second model; training the first model based on at least the first constraint and the second constraint, so as to obtain a trained first model.

17 Claims, 7 Drawing Sheets

(56) References Cited

OTHER PUBLICATIONS

Official Communication issued in corresponding European Patent Application No. 21197956.2, mailed on Apr. 8, 2022.
Ruffy et al., "The State Of Knowledge Distillation For Classification Tasks", arxiv.org, Cornell University Library, Dec. 20, 2019, pp. 1-8.
Xie et al., "Unsupervised Data Augmentation for Consistency Training", arixiv. org, Cornell University Library, Nov. 5, 2020, pp. 1-20.

* cited by examiner

METHOD AND APPARATUS OF TRAINING MODEL, DEVICE, MEDIUM, AND PROGRAM PRODUCT

CROSS-REFERENCE TO RELATED APPLICATION

This application claims the benefit of Chinese Patent Application No. 202110321597.X filed on Mar. 25, 2021, the content of which is incorporated herein by reference.

TECHNICAL FIELD

The present disclosure relates to a field of artificial intelligence, and in particular to a method and apparatus of training a model, a device, a computer-readable storage medium, and a computer program product.

BACKGROUND

With a development of an information technology, neural networks are widely used in various machine learning tasks such as computer vision, speech recognition and information retrieval. Optical character recognition (OCR) is a technology for converting a picture information into a text information that is easier to edit and store. OCR performed using a neural network has been verified as an effective recognition method. However, accuracy of a trained model needs to be improved.

SUMMARY

According to exemplary embodiments of the present disclosure, there is provided a method and apparatus of training a model, a device, a computer-readable storage medium, and a computer program product.

In a first aspect of the present disclosure, there is provided a method of training a model, including: determining a plurality of augmented sample sets associated with a plurality of original samples; determining a first constraint according to a first model based on the plurality of augmented sample sets, wherein the first constraint is associated with a difference between outputs of the first model for different augmented samples in one augmented sample set of the plurality of augmented sample sets; determining a second constraint according to the first model and a second model based on the plurality of augmented sample sets, wherein the second constraint is associated with a difference between an output of the first model and an output of the second model for one augmented sample in the plurality of augmented sample sets, and the first model has a complexity lower than that of the second model; and training the first model based on at least the first constraint and the second constraint, so as to obtain a trained first model.

In a second aspect of the present disclosure, there is provided an electronic device, including: at least one processor; and a memory communicatively connected to the at least one processor, wherein the memory stores instructions executable by the at least one processor, and the instructions, when executed by the at least one processor, cause the at least one processor to implement the method according to the first aspect of the present disclosure.

In a third aspect of the present disclosure, there is provided an electronic device, including: at least one processor; and a memory communicatively connected to the at least one processor, wherein the memory stores instructions executable by the at least one processor, and the instructions, when executed by the at least one processor, cause the at least one processor to implement the method according to the second aspect of the present disclosure.

In a fourth aspect of the present disclosure, there is provided a non-transitory computer-readable storage medium having computer instructions stored thereon, wherein the computer instructions allow a computer to implement the method according to the first aspect of the present disclosure.

In a fifth aspect of the present disclosure, there is provided a non-transitory computer-readable storage medium having computer instructions stored thereon, wherein the computer instructions allow a computer to implement the method according to the second aspect of the present disclosure.

In a sixth aspect of the present disclosure, there is provided a computer program product containing a computer program, wherein the computer program, when executed by a processor, causes the processor to implement the method according to the first aspect of the present disclosure.

In a seven aspect of the present disclosure, there is provided a computer program product containing a computer program, wherein the computer program, when executed by a processor, causes the processor to implement the method according to the second aspect of the present disclosure.

It should be understood that content described in this section is not intended to limit key or important features in the embodiments of the present disclosure, nor is it intended to limit the scope of the present disclosure. Other features of the present disclosure will be easily understood through the following description.

BRIEF DESCRIPTION OF THE DRAWINGS

The above and other features, advantages and aspects of the embodiments of the present disclosure will become more apparent in combination with the drawings and with reference to the following detailed description. In the drawings, same or similar reference numerals indicate same or similar elements. The drawings are used to understand the solution better and do not constitute a limitation to the present disclosure.

DETAILED DESCRIPTION OF EMBODIMENTS

Hereinafter, embodiments of the present disclosure will be described in more detail with reference to the drawings.

Although some embodiments of the present disclosure are shown in the drawings, it should be understood that the present disclosure may be implemented in various forms and should not be construed as being limited to the embodiments set forth herein. On the contrary, these embodiments are provided for a more thorough and complete understanding of the present disclosure. It should be understood that the drawings and the embodiments of the present disclosure are only used for exemplary purposes, and are not used to limit the protection scope of the present disclosure.

In the description of the embodiments of the present disclosure, the term "including" and similar terms should be understood as open-ended inclusion, that is, "including but not limited to". The term "based on" should be understood as "at least partially based on." The term "an embodiment," "one embodiment" or "this embodiment" should be understood as "at least one embodiment." The terms "first," "second," and the like may refer to different or the same objects. The following may also include other explicit and implicit definitions.

In the embodiments of the present disclosure, the term "model" may process an input and provide a corresponding output. Taking a neural network model as an example, it generally includes an input layer, an output layer, and one or more hidden layers between the input layer and the output layer. A model used in a deep learning application (also known as "deep learning model") generally includes a plurality of hidden layers, so as to extend a depth of the network. The layers of the neural network model are connected in sequence so that an output of a previous layer is used as an input of a next layer. The input layer may receive the input of the neural network model, and the output of the output layer is used as a final output of the neural network model. Each layer of the neural network model may include one or more nodes (also known as processing nodes or neurons), and each node may process an input from an upper layer. Here, the terms "neural network", "model", "network" and "neural network model" are used interchangeably.

As mentioned above, an accuracy of the trained model needs to be improved. In a traditional scheme, generally, only an output of a teacher model and an output of a student model are determined, and the student model is supervised by the teacher model to perform the training of model. A defect of the traditional scheme is that a relationship between outputs of the model for different samples for the same sample is not taken into account. As a result, processing results of the model for different augmented samples for the same sample are not consistent. This generally leads to a low accuracy and generalization of the model.

Exemplary embodiments of the present disclosure propose a scheme of training a model. In this scheme, firstly, an augmented sample set associated with an original sample is determined. The augmented sample set includes different augmented samples for one original sample. Then, a first constraint is determined according to a first model. The first constraint is associated with a difference between outputs of the first model for different augmented samples in one augmented sample set. Next, a second constraint is determined according to the first model and a second model. The second constraint is associated with a difference between the output of the first model and the output of the second model for the one augmented sample. The first model has a complexity lower than that of the second model. Finally, the first model is trained based on the first constraint and the second constraint, so as to obtain a trained first model. In this way, the accuracy of the trained model may be improved by supervising the training of the model with low complexity using the model with high complexity. Further, the consistency of the outputs of the model for different augmented samples for the one sample is taken into account, and the generalization of the trained model may be improved.

Figure 1A:
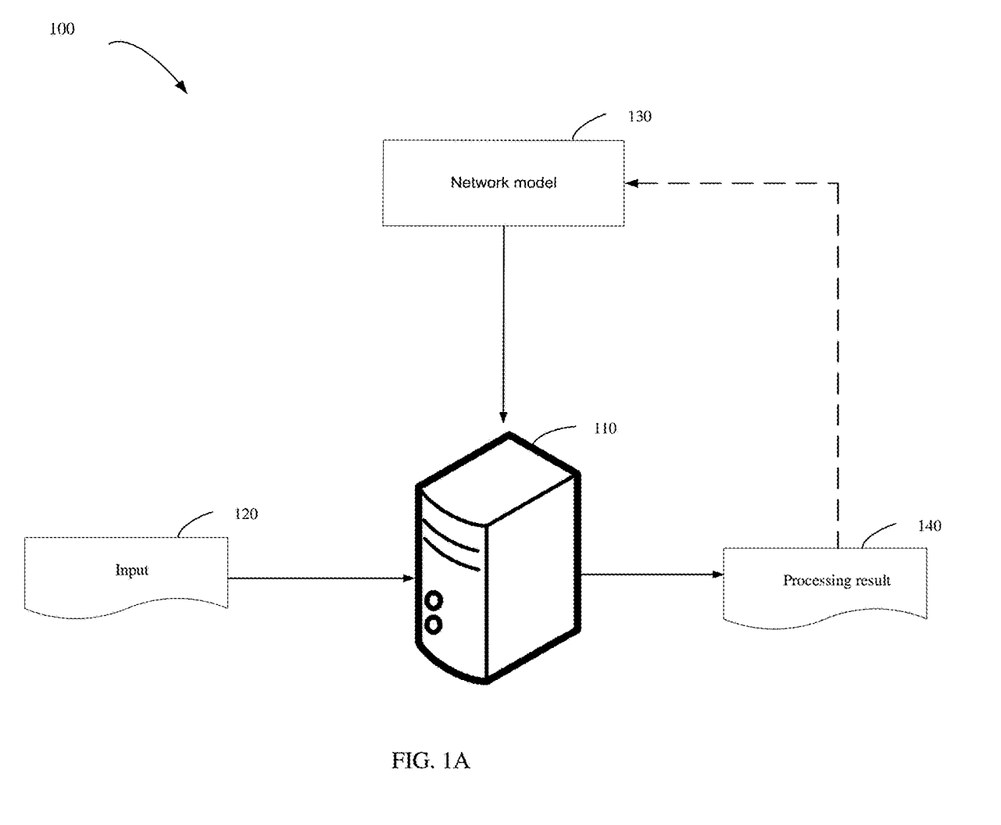
FIG. 1A shows a schematic diagram of an example of an environment for data processing in which some embodiments of the present disclosure may be implemented.

FIG. 1A shows a schematic diagram of an environment 100 for data processing in which some embodiments of the present disclosure may be implemented. As shown in FIG. 1A, the environment 100 includes a computing device 110. The computing device 110 may be any device with computing capabilities, such as a personal computer, a tablet computer, a wearable device, a cloud server, a mainframe, a distributed computing system, and so on.

The computing device 110 may acquire an input 120. For example, the input 120 may be an image, a video, an audio, a text, and/or a multimedia file. The computing device 110 may apply the input 120 to a network model 130, so as to generate a processing result 140 for the input 120 by using the network model 130. In some embodiments, the network model 130 may be, but is not limited to, an OCR model, an image classification model, a semantic segmentation model, a target detection model, or other neural network models related to image processing. The network model 130 may be implemented using any suitable network structure, including but not limited to a support vector machine (SVM) model, a Bayesian model, a random forest model, and various deep learning/neural network models, such as a convolutional neural network (CNN), a recurrent neural network (RNN), a deep neural network (DNN), a deep reinforcement learning network (e.g., DQN), and so on. The scope of the present disclosure is not limited in this respect.

The environment 100 may further include a training data acquisition device, a model training device, and a model application device (not shown). In some embodiments, the plurality of devices described above may be implemented in different physical computing devices. Alternatively, at least some of the plurality of devices described above may be implemented as a single computing device. For example, the training data acquisition device and the model training device may be implemented in one computing device, while the model application device may be implemented in another computing device.

In some embodiments, in a model training stage, the training data acquisition device may acquire the input 120 and provide the input 120 to the model. The input 120 may be an original sample and different augmented samples associated with the original sample, and the network model 130 is a model to be trained. The model training device may train the network model 130 based on the input. The processing result 140 may be different constraints for the model, and the computing device 110 may adjust training parameters (for example, weight, offset, etc.) of the network model 130 through different constraints, so as to reduce an error of the model on the training samples.

Alternatively, in some embodiments, in a final stage of the model training, the input may be a test sample, and the processing result 140 may be a representation of a performance index (e.g., accuracy) of the trained network model 130, which may be expressed, for example, by a test loss.

An environment 150 for training the model is described in detail below with reference to FIG. 1B. The environment 150 may include an original sample 122 as the input 120. Although one original sample is shown, the environment 150 may include a plurality of original samples, which is not limited in the present disclosure. In some embodiments, the sample may be image data. The computing device 110 (for example, a training data acquisition device of the computing device) may be configured to perform data augmentation processing on the original sample, so as to obtain an augmented sample set 124. The augmented sample set 124 may include a first augmented sample 126 and a second augmented sample 128, which may be obtained by performing the data augmentation processing on the original sample 122. In some embodiments, the augmented sample set associated with the original sample may not include the original sample. In some examples, for an image sample, an augmented sample set for the image may be obtained by image clipping, image rotation and image flipping. In other examples, for an image sample, an automatic sample augmentation strategy such as automatic data augmentation (AutoAugment) may be applied to obtain an augmented training set for the image.

The computing device may use the first augmented sample 126 and the second augmented sample 128 as an input of a first model 132 and an input of a second model 134, so as to determine a first output 162, a second output 164, a third output 166 and a fourth output 168, respectively. The computing device 110 may then determine a first constraint 142, a second constraint 144 and a third constraint 146 according to the above outputs and a label of the augmented sample. Finally, the computing device 110 may train the first model 132 according to the above constraints.

The first model 132 may be a model to be trained (or called a student model), which contains a small amount of parameters (for example, less than a threshold) and occupies a small amount of memory (for example, less than a threshold). The second model 134 may be a trained model (or called a teacher model), which contains a large amount of parameters (for example, at least greater than the amount of parameters contained in the first model 132).

Referring back to FIG. 1A, the trained network model may be provided to the model application device. The model application device may acquire the trained model and the input 120, and determine the processing result 140 for the input 120. In a model application stage, the input 120 may be input data to be processed (e.g., image data), the network model 130 may be a trained model (e.g., a trained image classification model), and the processing result 140 may be a predicted result (e.g., an image classification result, a semantic segmentation result, or a target recognition result) for the input 120 (e.g., image data).

Figure 1B:
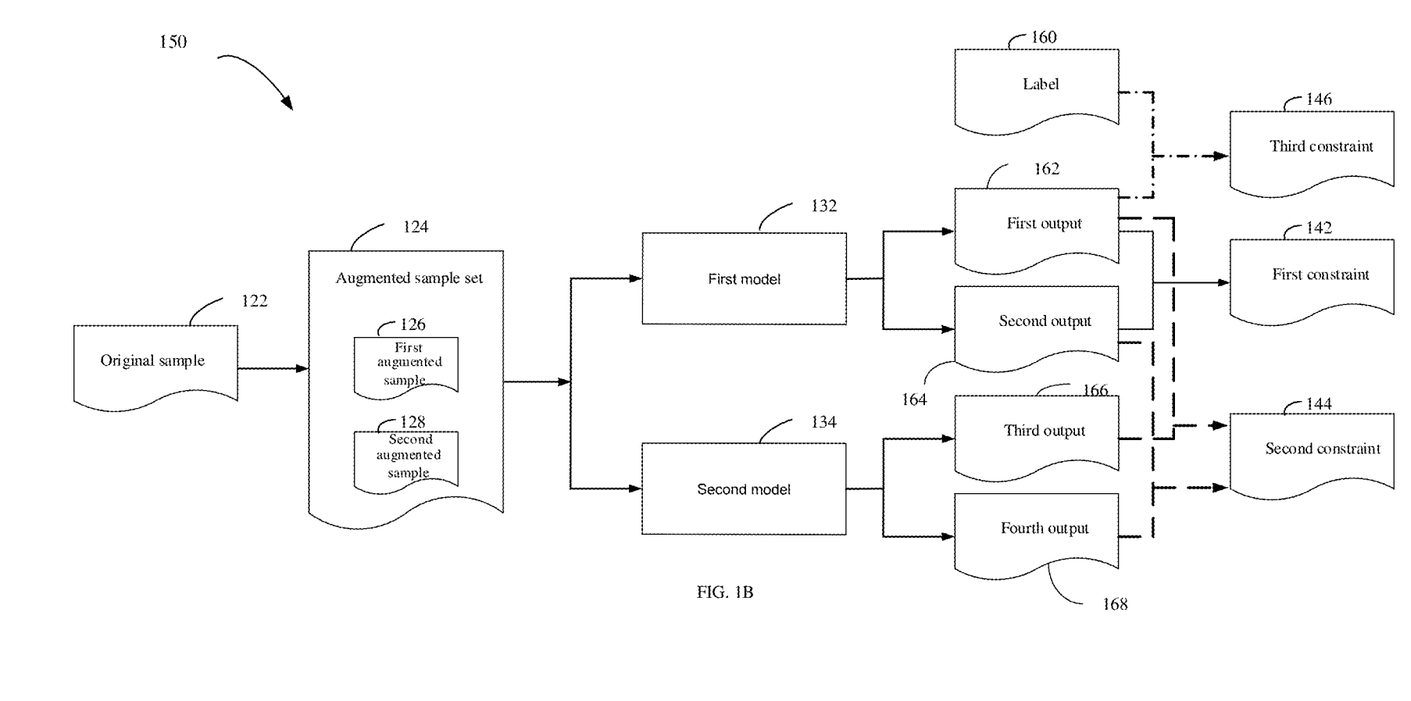
FIG. 1B shows a schematic diagram of an example of an environment for training a model in which some embodiments of the present disclosure may be implemented.

It should be understood that the environment 100 shown in FIG. 1A and the environment 150 shown in FIG. 1B are only examples in which the embodiments of the present disclosure may be implemented, and are not intended to limit the scope of the present disclosure. The embodiments of the present disclosure are also applicable to other systems or architectures.

Figure 2:
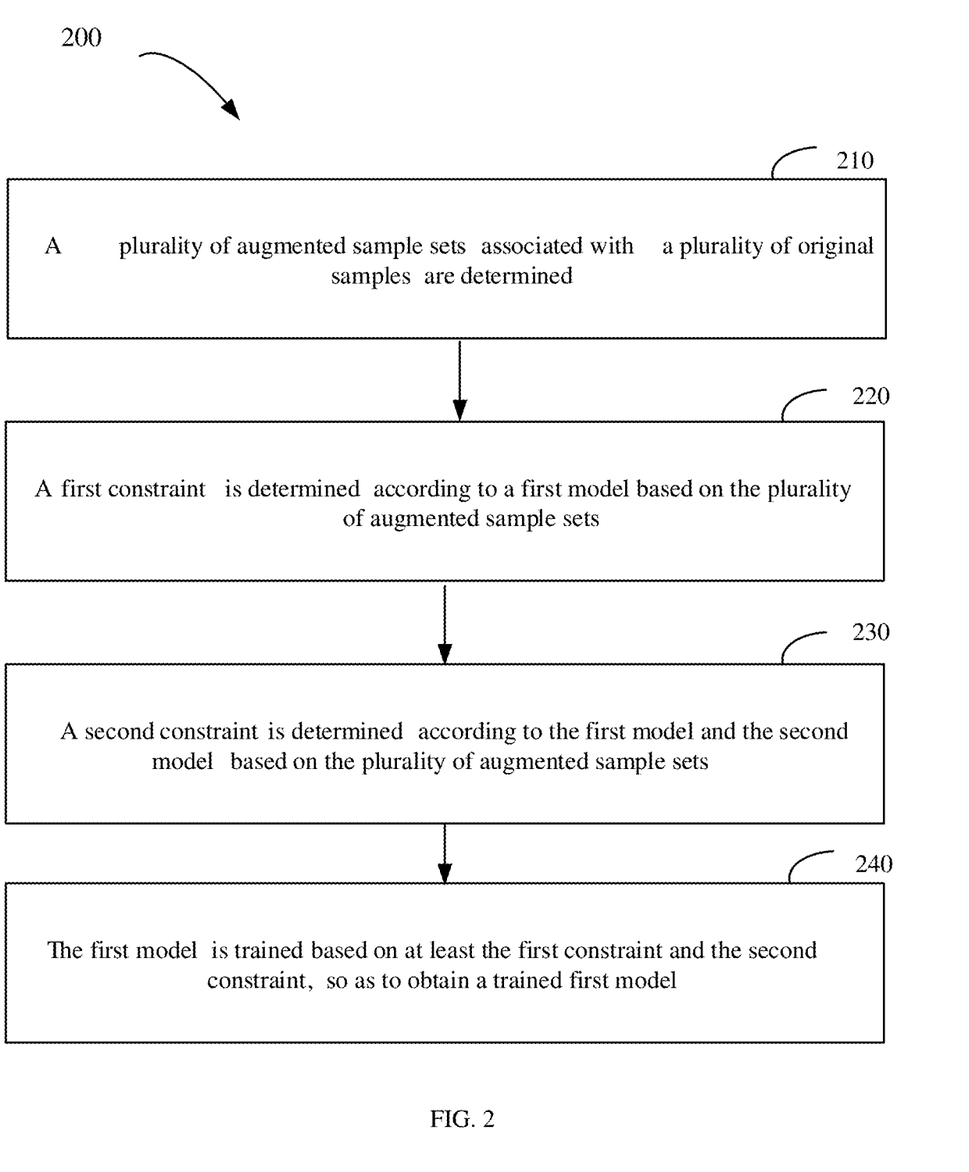
FIG. 2 shows a flowchart of an exemplary method of training a model according to some embodiments of the present disclosure.

A detailed process of training the model is further described below in conjunction with FIG. 2 to FIG. 3. FIG. 2 shows a flowchart of a process 200 of training a model according to some embodiments of the present disclosure. The process 200 may be implemented by the computing device 110 in FIG. 1. For ease of description, the process 200 will be described with reference to FIG. 1A and FIG. 1B.

In block 210 of FIG. 2, the computing device 110 determines a plurality of augmented sample sets associated with a plurality of original samples. For example, the computing device 110 may randomly select B images from an image set as the plurality of original samples, and then copy each original sample into K copies. Next, the computing device 110 may perform data augmentation operations such as brightness transformation, random clipping, random rotation, etc. on the K same images, respectively, so as to form an augmented sample set. The above examples of data augmentation are only exemplary. The computing device 110 may also, for example, process video data by making various combinations of different image frames in the video data, or may also process text and voice data in an appropriate manner, which is not limited in the present disclosure.

In some embodiments, in order to reduce an amount of calculation of the model, the computing device 110 may further process the augmented sample set. For example, the computing device 110 may resize and normalize the image, so as to form a preprocessed image.

In some embodiments, the sample may include at least one of an image, a video, an audio, a text, and a multimedia file.

In block 220 of FIG. 2, the computing device 110 determines a first constraint according to a first model based on the plurality of augmented sample sets. The first constraint is associated with a difference between outputs of the first model for different augmented samples in the one augmented sample set. After the augmented samples are determined by the computing device 110, the augmented sample set may be used as the inputs of the first model so as to determine respective outputs.

In some embodiments, the computing device 110 may generate a first classification result according to the first model 132 based on a first augmented sample in an augmented sample set, generate a second classification result according to the first model 132 based on a second augmented sample in the one augmented sample set, generate a third classification result according to the first model 132 based on a third augmented sample in the augmented sample set, and then determine the first constraint based on a difference between the first classification result, the second classification result and the third classification result.

For example, the original sample is an image containing a number 1. The first augmented sample, the second augmented sample and the third augmented sample are augmented samples for the original sample with different brightness, different direction and different size, respectively. The computing device 110 may determine outputs of the first model for these three augmented samples, including: a first classification result indicating a probability of 80% that the number is 1, a probability of 15% that the number is 7, and a probability of 5% that the number is 9; a second classification result indicating a probability of 60% that the number is 1, a probability of 25% that the number is 7, and a probability of 15% that the number is 9; and a third classification result indicating a probability of 40% that the number is 1, a probability of 30% that the number is 7, and a probability of 30% that the number is 9. Then, the computing device 110 may calculate a difference between each two of these three classification results as the first constraint. The computing device 110 may calculate a L2 loss function of the difference between each two of the classification results, and then determine an average value as the first constraint. It should be noted that the above description of the type of the original sample, the classification result and the loss function is only exemplary, and there may be different types of samples and classification results.

It may be understood that the outputs of the model for different augmented samples for the one original sample shall be consistent. The computing device 110 may adjust parameters of the first model 132 to minimize the first constraint, so as to achieve consistency between the outputs for different augmented samples for the one original sample. In this way, an adaptability of the model to different augmented data may be improved, so that a generalization performance of the model may be improved.

In block 230 of FIG. 2, the computing device 110 determines a second constraint according to the first model 132 and the second model 134 based on the plurality of augmented sample sets. The second constraint is associated with a difference between the output of the first model 132 and the output of the second model 134 for the one augmented sample, and the first model 132 has a complexity lower than that of the second model 134. As described above according to FIG. 1, the first model with a low complexity may be trained by using the second model with a high complexity. For example, the difference between the output of the first model and the output of the second model for the same sample may be determined as the second constraint.

In some embodiments, the computing device 110 may generate a fourth classification result according to the first model 132 based on a fourth augmented sample, then generate a fifth classification result according to the second model 134 based on the fourth augmented sample, and finally determine the second constraint based on a difference between the fourth classification result and the fifth classification result.

For example, for the fourth augmented sample, such as a picture containing a traffic light, the fourth classification result of the first model shows a probability of 70% that the red light is on, a probability of 20% that the green light is on, and a probability of 10% that the yellow light is on; and the fifth classification result of the second model shows a probability of 50% that the red light is on, a probability of 30% that the green light is on, and a probability of 20% that the yellow light is on. Then, the computing device 110 may determine the difference between the fourth classification result and the fifth classification result as the second constraint. For example, the computing device 110 may calculate a cross entropy loss of the difference between the fourth classification result and the fifth classification result as the second constraint as the second constraint. It may be understood that the computing device 110 may adjust the parameters of the first model 132 so as to minimize the second constraint. In this way, a small-parameter model may reach a recognition accuracy of a large-parameter model.

In block 240 of FIG. 2, the computing device 110 trains the first model based on at least the first constraint and the second constraint, so as to obtain a trained first model. For example, the computing device 110 may adjust the parameters of the first model according to the constraints determined above, so as to obtain the trained first model.

In some embodiments, the augmented sample may contain a label indicating a class of the augmented sample. For example, the label may indicate that the picture contains the number 1 or that the green light is on. The computing device 110 may determine a third constraint according to the first model 132 based on the plurality of augmented sample sets, and the third constraint is associated with a difference between the label and the output of the first model 132 for the augmented sample. For example, the computing device 110 may determine a CTC loss function of the difference between the label and the output (for example, the classification result) of the first model as the third constraint.

After the third constraint is determined by the computing device 110, the computing device 110 may train the first model based on the first constraint, the second constraint, the third constraint, a weight associated with the first constraint, a weight associated with the second constraint, and a weight associated with the third constraint, so as to obtain the trained first model.

For example, taking FIG. 1B as an example, the computing device 110 may determine the first constraint 142 based on a difference between the first output 162 and the second output 164 of the first model 132 for the first augmented sample 126 and the second augmented sample 128 for the original data 122. The computing device 110 may further determine the second constraint 144 based on the difference between the output of the first model 132 and the output of the second model 134 (that is, the difference between the first output 162 and the third output 166, the difference between the second output 164 and the fourth output 168) for the one augmented sample (the first augmented sample 126, the second augmented sample 128, or both). The computing device 110 may further determine the third constraint 146 based on the difference between the label 160 and the first output 162 or the second output 164. A total constraint may be determined by the computing device 110 according to Equation (1).

Total constraint=weight 1*first constraint+weight 2*second constraint+weight 3*third constraint    Equation (1)

where the weights may be adjusted according to different application needs. Finally, the computing device 110 may adjust the parameters of the first model 132 according to the total constraint so as to minimize the total constraint, and then the trained first model is obtained.

In some embodiments, the computing device 110 may adjust the three weights continuously according to test results for the first model 132. For example, if the computing device 110 determines a large difference between the outputs of the model for difference augmented samples for the one original sample in a model test stage, a value of the weight 1 may be set to be much greater than that of the weight 2 and that of the weight 3. In this way, the model may be trained in a targeted manner by adjusting the weights representing different constraints, so as to perform an efficient and accurate model training.

According to the embodiments of the present disclosure, the accuracy of the trained model may be improved by supervising the training of the model with a low complexity using the model with a high complexity. Further, the consistency of the outputs of the model for different augmented samples for the same sample is taken into account, and the generalization of the trained model may be improved.

Figure 3:
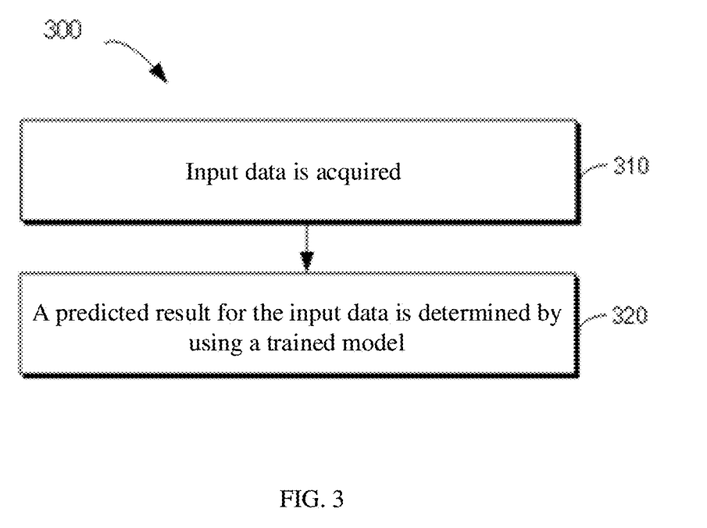
FIG. 3 shows a flowchart of an exemplary method of processing data according to some embodiments of the present disclosure.

FIG. 3 shows a flowchart of an exemplary method 300 of processing data according to some embodiments of the present disclosure. For example, the method 300 may be performed by the computing device shown in FIG. 1A.

In block 310 of FIG. 3, the computing device 110 may acquire input data. A trained model obtained by the method described above may be deployed in the computing device 110. In some embodiments, the input data may be image data to be classified, and the trained model is one of an image classification model, a semantic segmentation model, and a target recognition model.

In block 320 of FIG. 3, the computing device 110 may determine a predicted result for the input data by using the trained model. For example, in an embodiment where the input data is image data to be classified and the trained model is an image classification model, the predicted result is a classification result for the image. In an embodiment where the input data is image data to be semantically segmented and the trained model is a semantic segmentation model, the predicted result is a semantic segmentation result. In an embodiment where the input data is image data to be with a target to be recognized and the trained model is a target recognition model, the predicted result is a target recognition result. The scheme according to the present disclosure may be further applied to other tasks related to image processing, or tasks performed based on an image processing technology (e.g., autonomous driving, autonomous parking, etc.).

Figure 4:
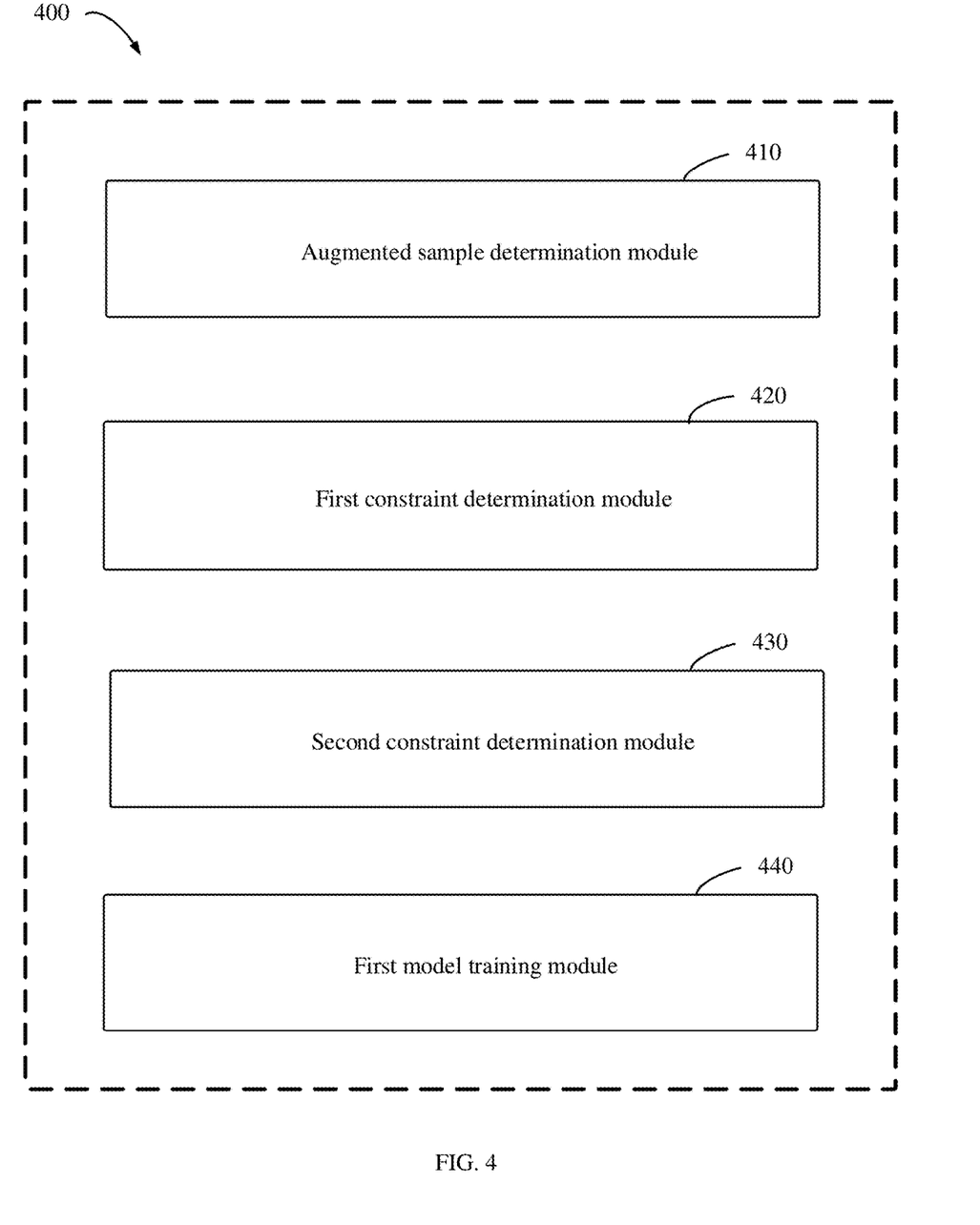
FIG. 4 shows a schematic block diagram of an apparatus of training a model according to some embodiments of the present disclosure.

FIG. 4 shows a schematic block diagram of an apparatus 400 of training a model according to some embodiments of the present disclosure. As shown in FIG. 4, the apparatus 400 may include: an augmented sample determination module 410 configured to determine a plurality of augmented sample sets associated with a plurality of original samples; a first constraint determination module 420 configured to determine a first constraint according to a first model based on the plurality of augmented sample sets. The first constraint is associated with a difference between outputs of the first model for different augmented samples in the one augmented sample set; a second constraint determination module 430 configured to determine a second constraint according to the first model and the second model based on the plurality of augmented sample sets. The second constraint is associated with a difference between the output of the first model and the output of the second model for the one augmented sample, and the first model has a complexity lower than that of the second model; and a first model training module 440 configured to train the first model based on at least the first constraint and the second constraint, so as to obtain a trained first model.

In some embodiments, the first constraint determination module 420 may include: a first result generation module configured to generate a first classification result according to the first model based on a first augmented sample in the augmented sample set; a second result generation module configured to generate a second classification result according to the first model based on a second augmented sample in the augmented sample set; a third result generation module configured to generate a third classification result according to the first model based on a third augmented sample in the augmented sample set; and a fourth constraint determination module configured to determine the first constraint based on a difference between the first classification result, the second classification result and the third classification result.

In some embodiments, an augmented sample contains a label indicating a class of the augmented sample, and the apparatus 400 may further include a fifth constraint determination module configured to determine a third constraint according to the first model based on the plurality of augmented sample sets. The third constraint is associated with a difference between the label and the output of the first model for the augmented sample.

In some embodiments, the first model training module 440 may be configured to train the first model based on the first constraint, the second constraint, the third constraint, a weight associated with the first constraint, a weight associated with the second constraint, and a weight associated with the third constraint, so as to obtain the trained first model.

In some embodiments, the second constraint determination module 430 may include: a fourth result generation module configured to generate a fourth classification result according to the first model based on a fourth augmented sample; a fifth result generation module configured to generate a fifth classification result according to the second model based on the fourth augmented sample; and a sixth constraint determination module configured to determine the second constraint based on a difference between the fourth classification result and the fifth classification result.

In some embodiments, the sample may include at least one of an image, a video, an audio, a text, and a multimedia file.

Figure 5:
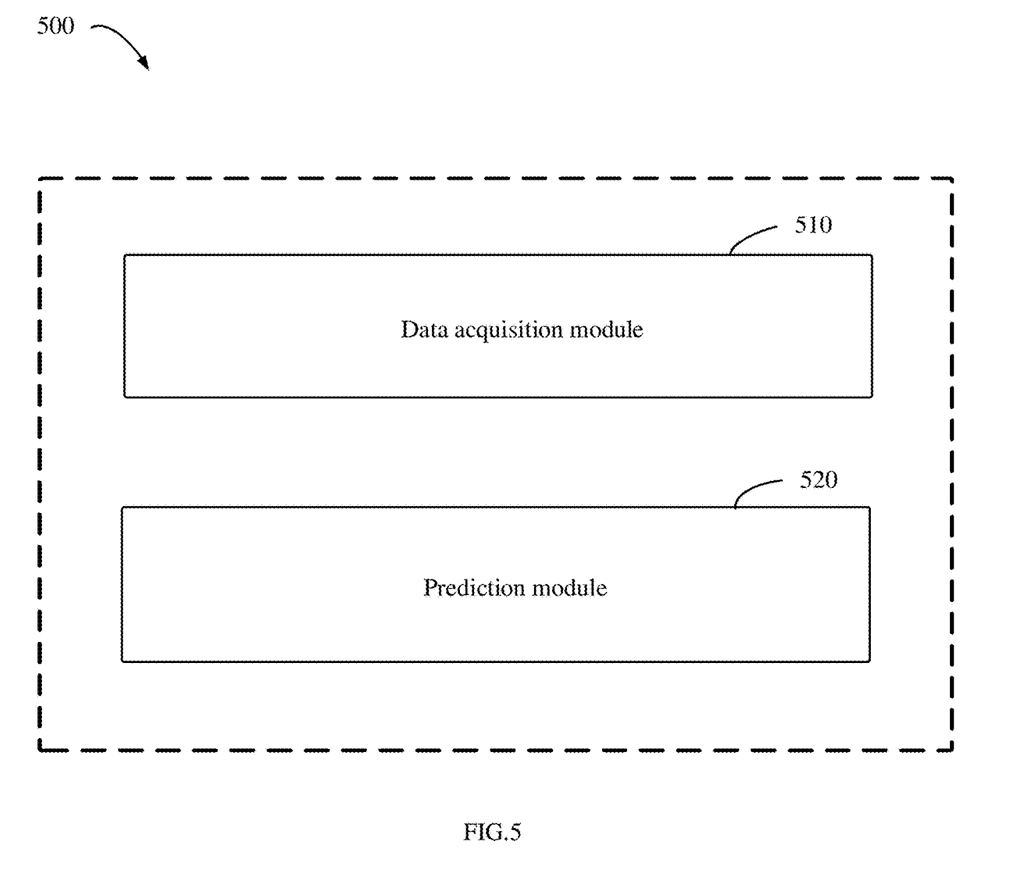
FIG. 5 shows a schematic block diagram of an apparatus of processing data according to some embodiments of the present disclosure.

FIG. 5 shows a schematic block diagram of an apparatus 500 of processing data according to some embodiments of the present disclosure. As shown in FIG. 5, the apparatus 500 includes: a data acquisition module 510 configured to acquire input data; and a prediction module 520 configured to determine a predicted result for the input data by using a trained model obtained by the apparatus according to the embodiments of the present disclosure.

In some embodiments, the input data may be data of an image, the trained model may be one of an image classification model, a semantic segmentation model and a target recognition model, and the predicted result may be a corresponding one of a classification result, a semantic segmentation result and a target recognition result of the image.

Figure 6:
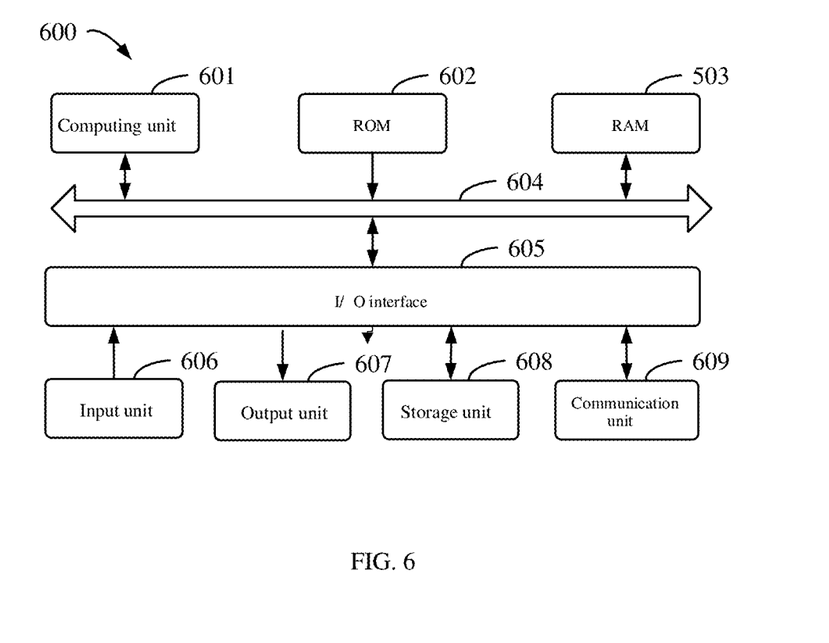
FIG. 6 shows a block diagram of an electronic device for implementing various embodiments of the present disclosure.

FIG. 6 shows a schematic block diagram of an exemplary electronic device 600 for implementing the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 6, the electronic device 600 includes a computing unit 601, which may perform various appropriate actions and processing based on a computer program stored in a read-only memory (ROM) 602 or a computer program loaded from a storage unit 608 into a random access memory (RAM) 603. Various programs and data required for the operation of the electronic device 600 may be stored in the RAM 603. The computing unit 601, the ROM 602 and the RAM 603 are connected to each other through a bus 604. An input/output (I/O) interface 605 is also connected to the bus 604.

Various components in the electronic device 600, including an input unit 606 such as a keyboard, a mouse, etc., an output unit 607 such as various types of displays, speakers, etc., a storage unit 608 such as a magnetic disk, an optical disk, etc., and a communication unit 609 such as a network card, a modem, a wireless communication transceiver, etc., are connected to the I/O interface 605. The communication unit 609 allows the electronic device 600 to exchange information/data with other devices through a computer network such as the Internet and/or various telecommunication networks.

The computing unit 601 may be various general-purpose and/or special-purpose processing components with processing and computing capabilities. Some examples of the computing unit 601 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 601 may perform the various methods and processes described above, such as the processes 200 and 300. For example, in some embodiments, the processes 200 and 300 may be implemented as a computer software program that is tangibly contained on a machine-readable medium, such as a storage unit 608. In some embodiments, part or all of a computer program may be loaded and/or installed on electronic device 600 via the ROM 602 and/or the communication unit 609. When the computer program is loaded into the RAM 603 and executed by the computing unit 601, one or more steps of the processes 200 and 300 described above may be performed. Alternatively, in other embodiments, the computing unit 601 may be configured to perform the processes 200 and 300 in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, also known as a cloud computing server or a cloud host. It is a host product in the cloud computing service system to solve shortcomings of difficult management and weak business scalability existing in the traditional physical host and VPS (Virtual Private Server) service. The server may also be a server of a distributed system or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a model, comprising:
determining a plurality of augmented sample sets associated with a plurality of original samples;
determining a first constraint according to a first model based on the plurality of augmented sample sets, wherein the first constraint is associated with a difference between outputs of the first model for different augmented samples in one augmented sample set of the plurality of augmented sample sets;
determining a second constraint according to the first model and a second model based on the plurality of augmented sample sets, wherein the second constraint is associated with a difference between an output of the first model and an output of the second model for one augmented sample in the plurality of augmented sample sets, and the first model has a complexity lower than that of the second model; and training the first model based on at least the first constraint and the second constraint, so as to obtain a trained first model, wherein the determining a first constraint according to a first model based on the plurality of augmented sample sets includes:

generating a first classification result according to the first model based on a first augmented sample in the one augmented sample set;

generating a second classification result according to the first model based on a second augmented sample in the one augmented sample set;

generating a third classification result according to the first model based on a third augmented sample in the one augmented sample set; and calculating the first constraint as an average value of L2 loss between every two of the first classification result, the second classification result, and the third classification result.

2. The method of claim 1, wherein an augmented sample contains a label indicating a class of the augmented sample, and the method further comprises:

determining a third constraint according to the first model based on the plurality of augmented sample sets, wherein the third constraint is associated with a difference between the label and the output of the first model for the augmented sample.

3. The method of claim 2, wherein the training the first model based on at least the first constraint and the second constraint, so as to obtain a trained first model comprises:

training the first model based on the first constraint, the second constraint, the third constraint, a weight associated with the first constraint, a weight associated with the second constraint, and a weight associated with the third constraint, so as to obtain the trained first model.

4. The method of claim 1, wherein the determining a second constraint according to the first model and a second model based on the plurality of augmented sample sets comprises:

generating a fourth classification result according to the first model based on a fourth augmented sample;

generating a fifth classification result according to the second model based on the fourth augmented sample; and determining the second constraint based on a difference between the fourth classification result and the fifth classification result.

5. The method of claim 1, wherein the plurality of original samples comprise at least one of an image, a video, an audio, a text, and a multimedia file.

6. A non-transitory computer-readable storage medium having computer instructions stored thereon, wherein the computer instructions allow a computer to implement the method of claim 1.

7. A method of processing data, comprising:

acquiring input data; and determining a predicted result for the input data by using a trained model obtained by operations of:

determining a plurality of augmented sample sets associated with a plurality of original samples;

determining a first constraint according to a first model based on the plurality of augmented sample sets, wherein the first constraint is associated with a difference between outputs of the first model for different augmented samples in one augmented sample set of the plurality of augmented sample sets;

determining a second constraint according to the first model and a second model based on the plurality of augmented sample sets, wherein the second constraint is associated with a difference between an output of the first model and an output of the second model for one augmented sample in the plurality of augmented sample sets, and the first model has a complexity lower than that of the second model; and training the first model based on at least the first constraint and the second constraint, so as to obtain a trained first model, wherein the determining a first constraint according to a first model based on the plurality of augmented sample sets includes:

generating a first classification result according to the first model based on a first augmented sample in the one augmented sample set;

generating a second classification result according to the first model based on a second augmented sample in the one augmented sample set;

generating a third classification result according to the first model based on a third augmented sample in the one augmented sample set; and calculating the first constraint as an average value of L2 loss between every two of the first classification result, the second classification result, and the third classification result.

8. The method of claim 7, wherein the input data is data of an image, the trained model is one of an image classification model, a semantic segmentation model and a target recognition model, and the predicted result is a corresponding one of a classification result, a semantic segmentation result and a target recognition result of the image.

9. An electronic device, comprising:

at least one processor; and a memory communicatively connected to the at least one processor, wherein the memory stores instructions executable by the at least one processor, and the instructions, when executed by the at least one processor, cause the at least one processor to implement the method of claim 7.

10. The electronic device of claim 9, wherein the input data is data of an image, the trained model is one of an image classification model, a semantic segmentation model and a target recognition model, and the predicted result is a corresponding one of a classification result, a semantic segmentation result and a target recognition result of the image.

11. A non-transitory computer-readable storage medium having computer instructions stored thereon, wherein the computer instructions allow a computer to implement the method of claim 7.

12. The storage medium of claim 11, wherein the input data is data of an image, the trained model is one of an image classification model, a semantic segmentation model and a target recognition model, and the predicted result is a corresponding one of a classification result, a semantic segmentation result and a target recognition result of the image.

13. An electronic device, comprising:

at least one processor; and a memory communicatively connected to the at least one processor, wherein the memory stores instructions executable by the at least one processor, and the instructions, when executed by the at least one processor, cause the at least one processor to perform operations for training a model, wherein the operations comprises:

determining a plurality of augmented sample sets associated with a plurality of original samples;

determining a first constraint according to a first model based on the plurality of augmented sample sets, wherein the first constraint is associated with a difference between outputs of the first model for different augmented samples in one augmented sample set of the plurality of augmented sample sets;

determining a second constraint according to the first model and a second model based on the plurality of augmented sample sets, wherein the second constraint is associated with a difference between an output of the first model and an output of the second model for one augmented sample in the plurality of augmented sample sets, and the first model has a complexity lower than that of the second model; and training the first model based on at least the first constraint and the second constraint, so as to obtain a trained first model, wherein the determining a first constraint according to a first model based on the plurality of augmented sample sets includes:

generating a first classification result according to the first model based on a first augmented sample in the one augmented sample set;

generating a second classification result according to the first model based on a second augmented sample in the one augmented sample set;

generating a third classification result according to the first model based on a third augmented sample in the one augmented sample set; and calculating the first constraint as an average value of L2 loss between every two of the first classification result, the second classification result and the third classification result.

14. The electronic device of claim 13, wherein an augmented sample contains a label indicating a class of the augmented sample, and the processor is further caused to:

determine a third constraint according to the first model based on the plurality of augmented sample sets, wherein the third constraint is associated with a difference between the label and the output of the first model for the augmented sample.

15. The electronic device of claim 14, wherein the processor is further caused to:

train the first model based on the first constraint, the second constraint, the third constraint, a weight associated with the first constraint, a weight associated with the second constraint, and a weight associated with the third constraint, so as to obtain the trained first model.

16. The electronic device of claim 13, wherein the processor is further caused to:

generate a fourth classification result according to the first model based on a fourth augmented sample;

generate a fifth classification result according to the second model based on the fourth augmented sample; and determine the second constraint based on a difference between the fourth classification result and the fifth classification result.

17. The electronic device of claim 13, wherein the plurality of original samples comprise at least one of an image, a video, an audio, a text, and a multimedia file.

* * * * *